(12) United States Patent
Zhao

(10) Patent No.: US 11,811,689 B2
(45) Date of Patent: Nov. 7, 2023

(54) TRANSMISSION METHOD AND APPARATUS BASED ON DIRECT LINK

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 425 days.

(21) Appl. No.: 17/296,202

(22) PCT Filed: Nov. 23, 2018

(86) PCT No.: PCT/CN2018/117218
§ 371 (c)(1),
(2) Date: May 21, 2021

(87) PCT Pub. No.: WO2020/103135
PCT Pub. Date: May 28, 2020

(65) Prior Publication Data
US 2022/0014325 A1 Jan. 13, 2022

(51) Int. Cl.
H04L 5/00 (2006.01)
H04L 1/00 (2006.01)

(52) U.S. Cl.
CPC .......... H04L 5/0048 (2013.01); H04L 1/0073 (2013.01)

(58) Field of Classification Search
None
See application file for complete search history.

(56) References Cited

U.S. PATENT DOCUMENTS

2017/0078945 A1   3/2017   Ma et al.
2017/0208618 A1   7/2017   Ding et al.
(Continued)

FOREIGN PATENT DOCUMENTS

CN   105101301 A   11/2015
CN   105530712 A   4/2016
(Continued)

OTHER PUBLICATIONS

Intellectual Property India, Office Action Issued in Application No. 202147024425, dated Feb. 23, 2022, (Submitted with Partial Machine Translation), (5p).
(Continued)

Primary Examiner — Suhail Khan
(74) Attorney, Agent, or Firm — Arch & Lake LLP

(57) ABSTRACT

The present disclosure provides sidelink-based transmission methods and apparatuses. A method includes: determining whether one or more resources occupied by a first sidelink channel and one or more resources occupied by a second sidelink channel conflict in a time domain, where the first sidelink channel is configured to transmit data for the sidelink and the second sidelink channel is configured to transmit feedback information for the sidelink; and transmitting target information to a receiver through a third sidelink channel in response to determining that the one or more resources occupied by the first sidelink channel and the one or more resources occupied by the second sidelink channel conflict in the time domain, where the target information includes at least one of the data or the feedback information.

13 Claims, 7 Drawing Sheets

(56) References Cited

U.S. PATENT DOCUMENTS

2017/0273130 A1    9/2017  Panteleev et al.
2019/0075608 A1    3/2019  Xing et al.
2020/0022089 A1*   1/2020  Guo ..................... H04W 24/08

FOREIGN PATENT DOCUMENTS

| CN | 107231702 A | 10/2017 |
|---|---|---|
| WO | 2018074876 A1 | 4/2018 |
| WO | 2018174630 A1 | 9/2018 |

OTHER PUBLICATIONS

International Search Report of International Application No. PCT/CN2018/117218 dated Jul. 29, 2019 with English translation, (4p).
State Intellectual Property Office of the People's Republic of China, Office Action and Search Report Issued in Application No. 201880002601.2 dated Aug. 30, 2021 with English translation (10p).
Extended European Search Report issued in Application No. 18940742.2 dated Nov. 10, 2021,(12p).
ISA State Intellectual Property Office of the People's Republic of China, Written Opinion of the International Searching Authority Issued in Application No. PCT/CN2018/117218, dated Jul. 29, 2019, WIPO, (9p).

* cited by examiner

TRANSMISSION METHOD AND APPARATUS BASED ON DIRECT LINK

CROSS-REFERENCE TO RELATED APPLICATION

This application is the national phase application of International Application No. PCT/CN2018/117218, filed on Nov. 23, 2018, the content of which is incorporated herein by reference in its entirety for all purposes.

TECHNICAL FIELD

The present disclosure relates to the field of communications, and in particular, relates to sidelink-based transmission methods and apparatuses.

BACKGROUND

According to Release 15 (Rel 15) on New Radio (NR), in the case that user equipment is configured to transmit uplink data through a physical uplink shared channel (PUSCH) and transmit uplink control information through a physical uplink control channel (PUCCH) in a same time unit, for example, in a slot, and one or more resources occupied by the PUSCH overlap with one or more resources occupied by the PUCCH in a time domain, the terminal has to multiplex and transmit the uplink control information and the uplink data in the PUSCH, as well as abandon the transmission in the PUCCH. The uplink control information includes terminal's feedback information on downlink data transmitted from a base station.

In the NR, the respective resources for transmitting the uplink data and transmitting the uplink control information are both scheduled by the base station, and the respective receivers of the uplink data and of the uplink control information are both the base station. Therefore, the base station, from its side, can accurately determine whether the terminal is expected to multiplex and transmit the uplink control information and the uplink data in the PUSCH within a given time unit.

However, in a sidelink communication of Vehicle to Everything (V2X, which is a wireless communication technology for vehicles) in the NR, the receiver of the data and the receiver of the feedback information may be different. In addition, it is not yet concluded in current standards whether corresponding resources and a corresponding modulation and coding scheme, which are adopted in the sidelink communication when the transmitter transmits the data and the feedback information, are determined by the transmitter.

In such case, the receiver cannot accurately determine whether the feedback information besides the data exists in a received physical sidelink shared channel (PSSCH), and the receiver cannot know how the PSSCH is occupied by the control information which is multiplexed with the data in the PSSCH, and cannot known what resources are occupied.

SUMMARY

In order to overcome the problems in the related art, embodiments of the present disclosure provide sidelink-based transmission methods and apparatuses.

According to a first aspect of the present disclosure, there is provided a sidelink-based transmission method. The method includes that a transmitter determines whether one or more resources occupied by a first sidelink channel and one or more resources occupied by a second sidelink channel conflict in a time domain, where the first sidelink channel is used for transmitting data for the sidelink and the second sidelink channel is used for transmitting feedback information for the sidelink. Additionally, the method includes that the transmitter transmits target information to a receiver through a third sidelink channel in response to determining that the one or more resources occupied by the first sidelink channel and the one or more resources occupied by the second sidelink channel conflict in the time domain, where the target information includes at least one of the data or the feedback information.

According to a second aspect of the present disclosure, there is provided a sidelink-based transmission method. The method includes that a receiver receives target information transmitted by a transmitter through a first sidelink channel, where the first sidelink channel is used for transmitting data for the sidelink, and where the target information includes the data or includes the data and feedback information.

According to a third aspect of the present disclosure, there is provided a sidelink-based transmission apparatus being applicable to a transmitter. The apparatus includes a processor and a memory configured to store instructions executable by the processor.

The processor is configured to: determine whether one or more resources occupied by a first sidelink channel and one or more resources occupied by a second sidelink channel conflict in a time domain, where the first sidelink channel is used for transmitting data for the sidelink and the second sidelink channel is used for transmitting feedback information for the sidelink; and transmit target information to a receiver through a third sidelink channel in response to determining that the one or more resources occupied by the first sidelink channel and the one or more resources occupied by the second sidelink channel conflict in the time domain, where the target information includes at least one of the data or the feedback information.

According to a fourth aspect of the present disclosure, there is provided a sidelink-based transmission apparatus being applicable to a receiver. The apparatus includes a processor and a memory configured to store instructions executable by the processor.

The processor is configured to: receive target information transmitted by a transmitter through a first sidelink channel, where the first sidelink channel is used for transmitting data for the sidelink, and where the target information includes the data or includes the data and feedback information.

It should be understood that the above general description and the following detailed description are only exemplary and explanatory and are not restrictive of the present disclosure.

BRIEF DESCRIPTION OF THE DRAWINGS

The drawings herein are incorporated into the specification and constitute a part of the specification, illustrate examples in accordance with the present disclosure, and together with the specification are used to explain the principle of the present disclosure.

DETAILED DESCRIPTION OF THE EMBODIMENTS

Figure 1:
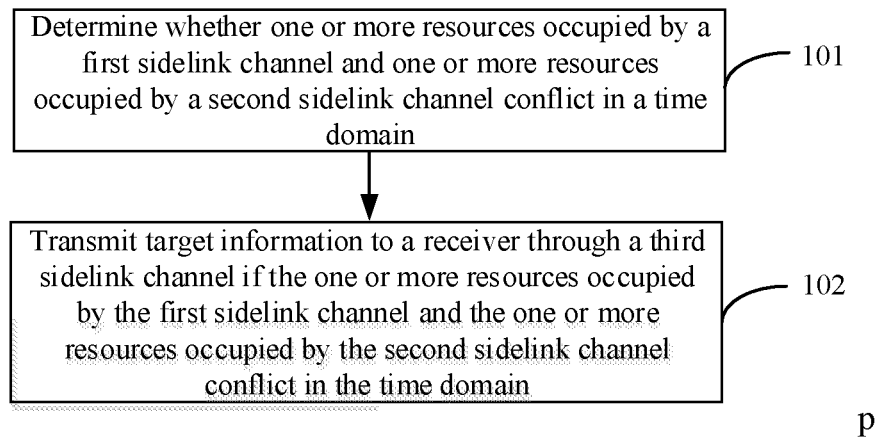
FIG. 1 is a schematic flowchart illustrating a sidelink-based transmission method according to an example.

Examples will be described in detail herein, with the illustrations thereof represented in the drawings. When the following descriptions involve the drawings, like numerals in different drawings refer to like or similar elements unless otherwise indicated. The implementation manners described in the following examples do not represent all the implementation manners consistent with the present disclosure. Rather, they are merely examples of apparatuses and methods consistent with some aspects of the present disclosure as detailed in the appended claims.

The terms used in the present disclosure are only for the purpose of describing specific examples, and are not intended to limit the present disclosure. The singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, first information may be referred as second information; and similarly, second information may also be referred as first information. Depending on the context, the word "if" as used herein can be interpreted as "upon" or "when" or "in response to determining".

At present, in order to support direct communication between devices, a sidelink communication mode has been introduced. For the sidelink communication, the direct communication between user equipment is achieved by utilizing a sidelink between the user equipment, which is beneficial to meet the requirements of shorter communication delay and higher wireless resource utilization efficiency.

Just as in examples of the present disclosure, target information is transmitted on the basis of the sidelink communication. Next, the sidelink-based transmission methods provided by the examples of the present disclosure are firstly introduced from a view of a transmitter.

In an example of the present disclosure, a sidelink-based transmission method is provided and applicable to the transmitter. Referring to FIG. 1, which is a flowchart illustrating a sidelink-based transmission method according to the example, the following steps may be included.

At step 101, it is determined whether one or more resources occupied by a first sidelink channel and one or more resources occupied by a second sidelink channel conflict in a time domain. The first sidelink channel is used for transmitting data for the sidelink and the second sidelink channel is used for transmitting feedback information for the sidelink.

At step 102, target information is transmitted to a receiver through a third sidelink channel if the one or more resources occupied by the first sidelink channel and the one or more resources occupied by the second sidelink channel conflict in the time domain. The target information includes at least one of the data or the feedback information.

In the above example, in the case that one or more resources occupied by a data channel of the sidelink communication and one or more resources occupied by a feedback information channel of the sidelink communication conflict in a time domain, it can achieve a purpose that at least one of the data or the feedback information is transmitted to the receiver through the third sidelink channel.

With respect to the step 101, the feedback information may be Hybrid Automatic Repeat request (HARQ) feedback information, Channel State Information (CSI), or the like.

With respect to the step 102, once the transmitter determines that the one or more resources occupied by the first sidelink channel and the one or more resources occupied by the second sidelink channel conflict in the time domain, the transmitter may multiplex the data and the feedback information together and transmit them to the receiver through the third sidelink channel if a receiver address corresponding to the data is consistent with a receiver address corresponding to the feedback information, that is, both the data and the feedback information are expected to be transmitted to a same receiver. The first sidelink channel used for transmitting the data for the sidelink may be directly taken as the third siedelink channel. In one or more embodiments, the first sidelink channel may be a Physical Sidelink shared channel (PSSCH), and the second sidelink channel may be a separate channel for transmitting the feedback information.

If the receiver address corresponding to the data is inconsistent with the receiver address corresponding to the feedback information, the data and the feedback information cannot be multiplexed in a same sidelink channel. In one or more embodiments, the transmitter may only transmit the data or only transmit the feedback information to the receiver. That is, the target information consists of either the data or the feedback information.

The transmitter may adopt the first sidelink channel to transmit the data to the receiver through the first sidelink channel when the target information consists of the data, and adopt the second sidelink channel to transmit the feedback information to the receiver through the second sidelink channel when the target information consists of the feedback information.

The receiver address corresponding to the feedback information is a source address of the data associated with the feedback information. For example, the feedback information is HARQ feedback information of data A, the source address corresponding to data A is IP address m, and thus the receiver address corresponding to the feedback information is the IP address m.

According to an example, alternatively or additionally, in one or more embodiments, if the receiver address corresponding to the data is inconsistent with the receiver address corresponding to the feedback information, the transmitter may determine that the target information consists of the data or the feedback information based on respective transmission priorities of the data and the feedback information.

For example, when the transmission priority of the feedback information is higher than or equal to the transmission priority of the data, the transmitter may determine that the target information consists of the feedback information. When the transmission priority of the feedback information is lower than the transmission priority of the data, the transmitter may determine that the target information consists of the data.

In the above example, the transmitter can transmit the information with greater importance first to the receiver based on the respective transmission priorities of the data and the feedback information.

Figure 2:
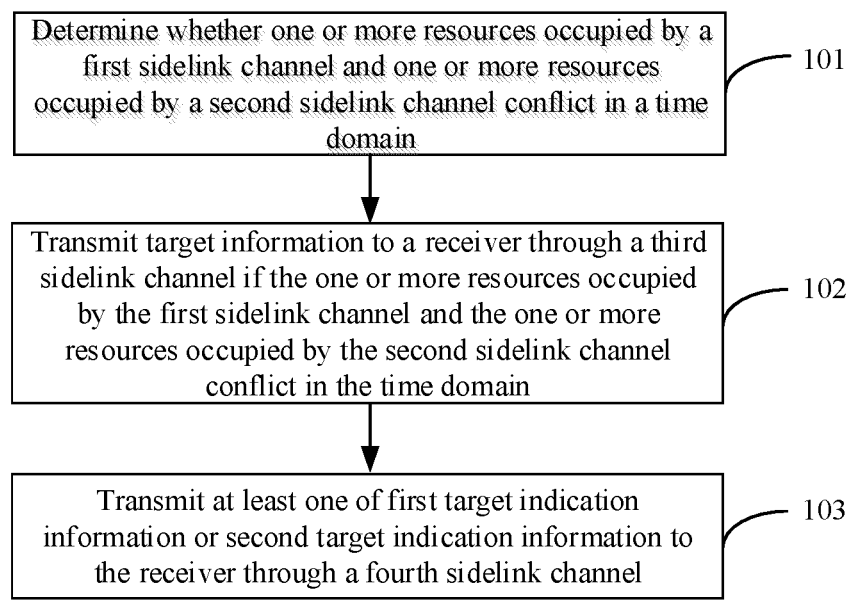
FIG. 2 is a schematic flowchart illustrating another sidelink-based transmission method according to an example.

In an example, referring to FIG. 2 which is a flowchart of another sidelink-based transmission method on the basis of the example illustrated in FIG. 1, if the target information includes the data and the feedback information, the method may further include the following step.

At step 103, at least one of first target indication information or second target indication information is transmitted to the receiver through a fourth sidelink channel.

In the examples of the present disclosure, the numbering of the steps is not used to limit any order of performing the steps. The step 103 may be performed before or at the time of performing the step 102, which is not limited in the present disclosure.

In this step, since the data and the feedback information are expected to be multiplexed in the first sidelink channel, the transmitter may transmit the first target indication information to the receiver through the fourth sidelink channel, so as to facilitate the receiver to be informed whether the data and the feedback information are included in the first sidelink channel that is received currently.

Or, the receiver defaults that the transmitter transmits the data and the feedback information simultaneously through the first sidelink channel, and thus the transmitter may also transmit the second target indication information to the receiver through the fourth sidelink channel, so as to make the receiver demodulate the feedback information correctly.

According to an example of the present disclosure, in one or more embodiments, the transmitter may also transmit the first target indication information and the second target indication information to the receiver through the fourth sidelink channel.

The second target indication information is configured to indicate a modulation and coding efficiency at which the feedback information is transmitted through the third sidelink channel. In one or more embodiments, the second target indication information may indicate a ratio of the modulation and coding efficiency of the data with respect to that of the feedback information.

For example, M is the bit number of the data to be transmitted, N is the number of time-frequency resources available for the first sidelink channel, K is the bit number of the feedback information to be transmitted, and the second target indication information indicates the ratio beta of the modulation and coding efficiency of the data with respect to that of the feedback information. Thus, when the feedback information and the data are multiplexed together for transmission, the number of time-frequency resources available for the feedback information is ceil(K*beta*N/M), and the remaining time-frequency resources are used by the data, where ceil( ) is a ceiling function.

In the above example, the fourth sidelink channel is configured to transmit control information associated with the data. In one or more embodiments, the first sidelink channel may be taken as the fourth sidelink channel. Or, the fourth sidelink channel may be a separate channel for transmitting the control information.

In an example, the step 103 may be implemented in any one of the following ways.

In the first way, at least one of the first target indication information or the second target indication information is represented by a demodulation reference signal sequence in the fourth sidelink channel or by position information corresponding to the demodulation reference signal sequence.

In this way, when transmitting the control information associated with the data to the receiver through the fourth sidelink channel, the transmitter may set the demodulation reference signal sequence corresponding to the fourth sidelink channel to a preset demodulation reference signal sequence.

The receiver may determine, based on the preset demodulation reference signal sequence, that the first target indication information indicates that the data and the feedback information are included in the third sidelink channel, i.e., the first sidelink channel. Or, the receiver may determine, based on the preset demodulation reference signal sequence, that the second target indication information indicates a preset value. Or, based on the preset demodulation reference signal sequence, the receiver may determine that the first target indication information indicates that the data and the feedback information are included in the third sidelink channel, i.e., the first sidelink channel, and determine that the second target indication information indicates the preset value.

Of course, the receiver may determine, if the demodulation reference signal sequence corresponding to the fourth sidelink channel does not adopt the preset demodulation reference signal sequence, that the first target indication information indicates that the feedback information is not included in the third sidelink channel, i.e., the first sidelink channel.

Alternatively, in an example of the present disclosure, the transmitter may set the demodulation reference signal sequence to a designated position. Thus, if the demodulation reference signal sequence is detected by the terminal at the designated position, the receiver determines that the first target indication information indicates that the data and the feedback information are included in the third sidelink channel, i.e, the first sidelink channel, or determines that the second target indication information indicate the preset value, or determines that the first target indication information indicates that the data and the feedback information are included in the third sidelink channel, i.e., the first sidelink channel, and that the second target indication information indicates the preset value.

If the demodulation reference signal sequence is not detected by the receiver at the designated position, the receiver may determine that the first target indication information indicates that the feedback information is not included in the third sidelink channel, i.e., the first sidelink channel.

Supposing that the demodulation reference signal sequence carried in the fourth sidelink channel is located at the designated position, for example, on the 0th, 4th, and 8th REs of every Resource Block (RB), it means that the first target indication information indicates that the target information in the first sidelink channel includes the data and the feedback information, and/or means that the second target indication information indicates the preset value.

If the demodulation reference signal sequence carried in the fourth sidelink channel is located at other positions, for example, on the 1st, 5th, and 9th REs of every RB, it means that the first target indication information indicates that the feedback information is not included in the first sidelink channel.

In the above example, the transmitter may represent at least one of the first target indication information or the second target indication information by a demodulation reference signal sequence or position information corresponding to the demodulation reference signal sequence in the fourth sidelink channel, which reduces the number of bits occupied by the control information and has a high availability.

In the second way, target control information is transmitted to the receiver through the fourth sidelink channel. The target control information carries at least one of the first target indication information or the second target indication information.

In this way, the target control information may be Sidelink Control Information (SCI). The SCI is essential control information transmitted by the transmitter to the receiver in the sidelink communication. In an example of the present disclosure, the transmitter may add respective information field(s) corresponding to the first target indication information and/or the second target indication information into the SCI, so that at least one of the first target indication information or the second target indication information is transmitted to the receiver through the SCI.

The first target indication information, which is taken as an example, is represented by adding only a 1-bit information field into the SCI. For example, when the bit value of the information field corresponding to the first target indication information is 1, it means the first target indication information indicates that the data and the feedback information are included in the third sidelink channel, i.e., the first sidelink channel, and when the bit value of the information field corresponding to the first target indication information is 0, it means the first target indication information indicates that the feedback information is not included in the third sidelink channel, i.e., the first sidelink channel.

The reverse may work similarly. When the bit value corresponding to the information field is 1, it means the first target indication information indicates that the feedback information is not included in the third sidelink channel, i.e., the first sidelink channel, and when the bit value corresponding to the information field is 0, it means the first target indication information indicates that the data and the feedback information are included in the third sidelink channel, i.e., the first sidelink channel.

Taken the second target indication information as an example, a specific value corresponding to the second target indication information may be represented by adding information field of at least one bit into the SCI, or the second target indication information is made to indicate the preset value by adding information field of at least one bit.

For example, when the bit value of the information field corresponding to the second target indication information is 01, it means the second target indication information indicates 01 or a first preset value a corresponding to 01, and when the bit value of the information field corresponding to the second target indication information is 10, it means the second target indication information indicates 10 or a second preset value b corresponding to 10.

In the above example, the transmitter may further transmit the target control information to the receiver through the fourth sidelink channel, and the target control information carries at least one of the first target indication information or the second target indication information. Compared with the first way of the step 103 described above, it reduces a complexity of blind channel detection at the receiver and has a high availability.

In an example, if the feedback information includes a plurality of pieces of sub-information corresponding to different feedback information types, for example, HARQ feedback information and CSI are included simultaneously, the transmitter may transmit a modulation and coding rate, at which sub-information with a designated feedback information type is transmitted through the third sidelink channel, to the receiver.

For example, if the designated feedback information type is of HARQ feedback information, the transmitter may transmit the modulation and coding efficiency corresponding to the HARQ feedback information to the receiver through the fourth sidelink channel.

In one or more embodiments, the designated feedback information type may come from all feedback information types or a part thereof, which is not limited in the present disclosure. The transmitter may set different modulation and coding rates, at which the sub-information of respective designated feedback information types is transmitted through the third sidelink channel, to a same value or different values.

For example, the modulation and coding efficiency corresponding to the HARQ feedback information is a1, and the modulation and coding efficiency corresponding to the CSI is a2. The value of a1 and the value of a2 may be the same or different, which is not limited in the present disclosure.

Different modulation and coding rates bring different reliability of the sub-information of the respective feedback information types. The lower the modulation and coding rate, the higher the reliability of the sub-information of the corresponding feedback information type.

In the above example, in the case that the feedback information to be transmitted by the transmitter includes the plurality of pieces of sub-information corresponding to different feedback information types, the transmitter may transmit to the receiver the modulation and coding efficiency at which the sub-information with the designated feedback information type is transmitted through the third sidelink channel. Thereafter, the receiver can correctly demodulate the plurality of pieces of sub-information of different feedback information types.

Figure 3:
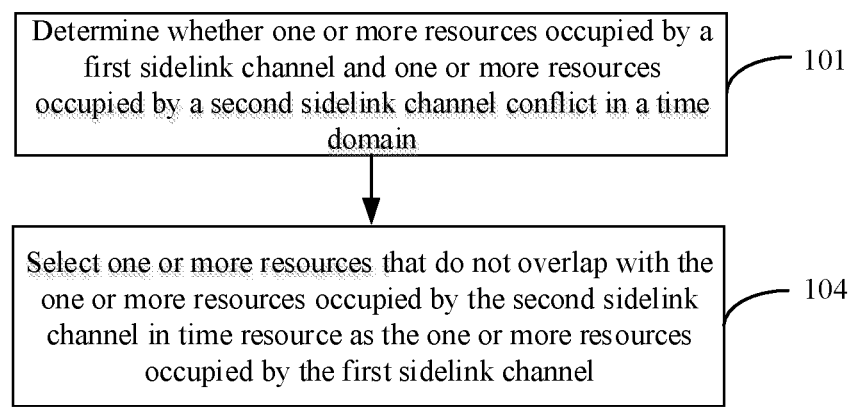
FIG. 3 is a schematic flowchart illustrating another sidelink-based transmission method according to an example.

In an example, referring to FIG. 3, which is a flowchart illustrating another sidelink-based transmission method according to the example illustrated in FIG. 1, if the one or more resources occupied by the first sidelink channel are selected by the transmitter, the method may further include the following step.

At step 104, one or more resources that do not overlap with the one or more resources occupied by the second sidelink channel in time resource are selected as the one or more resources occupied by the first sidelink channel.

In this step, if the one or more resources occupied by the first sidelink channel may be selected by the transmitter, the transmitter may select one or more resources that do not overlap with the one or more resources occupied by the second sidelink channel in time resource as the one or more resources occupied by the first sidelink channel. Therefore, it can avoid a conflict in the time domain between the one or more resources occupied by the first sidelink channel and the one or more resources occupied by the second sidelink channel.

Of course, when the transmitter selects the one or more resource that do not overlap with the one or more resources occupied by the second sidelink channel in time resource as the one or more resources occupied by the first sidelink channel, it has been determined that the receiver address corresponding to the data is inconsistent with the receiver address corresponding to the feedback information and thus the data and the feedback information cannot be multiplexed in the third sidelink channel for synchronous transmission.

According to the above example, in one or more embodiments, the second sidelink channel may be selected by the transmitter or another device, and said another device may be a base station, a receiver, or other third-party device, which is not limited in the present disclosure.

Figure 4:
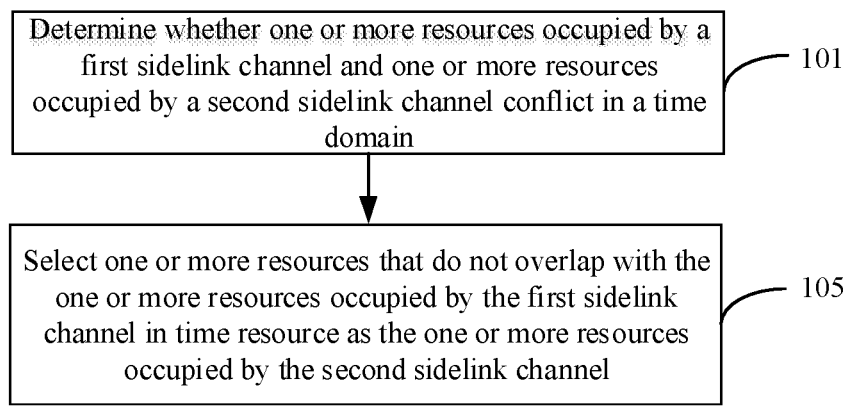
FIG. 4 is a schematic flowchart illustrating another sidelink-based transmission method according to an example.

In an example, referring to FIG. 4, which is a flowchart illustrating another sidelink-based transmission method according to the example illustrated in FIG. 1, if the one or more resources occupied by the second sidelink channel are selected by the transmitter, the method may further include the following step.

At step 105, one or more resources that do not overlap with the one or more resources occupied by the first sidelink channel in time resource are selected as the one or more resources occupied by the second sidelink channel.

In this step, if the one or more resources occupied by the second sidelink channel may be selected by the transmitter, the transmitter may select one or more resources that do not overlap with the one or more resources occupied by the first sidelink channel in time resource as the one or more resources occupied by the second sidelink channel. Therefore, it can avoid a conflict in the time domain between the one or more resources occupied by the first sidelink channel and the one or more resources occupied by the second sidelink channel.

Of course, similarly, when the transmitter selects the one or more resource that do not overlap with the one or more resources occupied by the first sidelink channel in time resource as the one or more resources occupied by the second sidelink channel, it has been determined that the receiver address corresponding to the data is inconsistent with the receiver address corresponding to the feedback information and thus the data and the feedback information cannot be multiplexed in the third sidelink channel for synchronous transmission.

According to the above example, in one or more embodiments, the first sidelink channel may be selected by the transmitter or another device, and said another device may be a base station, a receiver, or other third-party device, which is not limited in the present disclosure.

Next, the sidelink-based transmission methods provided by the examples of the present disclosure are further introduced from a view of a receiver.

An example of the present disclosure provides another sidelink-based transmission method, which is applicable to the receiver and may include the following step.

At step 201, target information transmitted by a transmitter through a first sidelink channel is received. The first sidelink channel is used for transmitting data for the sidelink, and the target information includes the data or includes the data and feedback information.

In the above example, the receiver may receive the target information transmitted by the transmitter through the first sidelink channel. The first sidelink channel is used for transmitting the data for the sidelink, and the target information includes the data or includes the data and the feedback information. Therefore, during a process of the sidelink communication, it achieves a purpose that the data and the feedback information are multiplexed in the first sidelink channel used for transmitting the data for the sidelink.

With respect to the step 201, in the case that the one or more resources occupied by the first sidelink channel and the one or more resources occupied by the second sidelink channel conflict in a time domain, the transmitter transmits the target information, i.e., the data and the feedback information, to the receiver through a third sidelink channel, i.e., the first sidelink channel if a receiver address corresponding to the data is consistent with a receiver address corresponding to the feedback information. The receiver can receive the target information directly.

If the receiver address corresponding to the data is inconsistent with the receiver address corresponding to the feedback information, the data and the feedback information cannot be multiplexed in a same sidelink channel. Thus, in one or more embodiments, when a transmission priority of the data is higher than a transmission priority of the feedback information, the transmitter may transmit the target information, i.e., the data, to the receiver through the first sidelink channel. Similarly, the receiver can receive the target information directly.

Of course, in an example of the present disclosure, if the receiver address corresponding to the data is inconsistent with the receiver address corresponding to the feedback information, and thus the data and the feedback information cannot be multiplexed in the same sidelink channel, when the transmission priority of the data is lower than or equal to the transmission priority of the feedback information, the transmitter may transmit the feedback information to the receiver through a second sidelink channel based on the related art. Similarly, the receiver can receive the feedback information directly.

Figure 5:
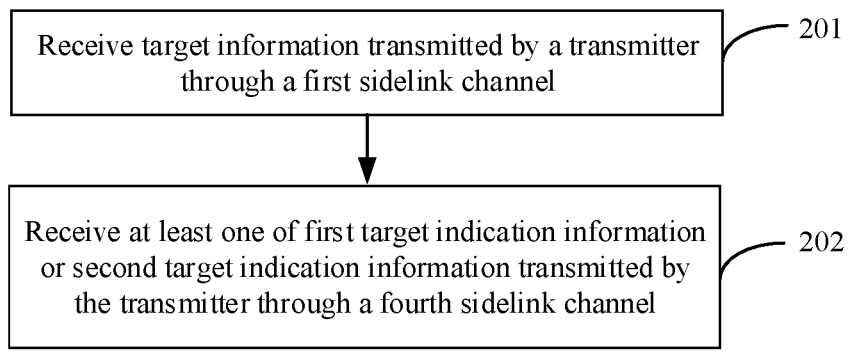
FIG. 5 is a flowchart illustrating another sidelink-based transmission method according to an example.

In an example of the present disclosure, it provides another sidelink-based transmission method, which is applicable to the receiver. Referring to FIG. 5, which is a flowchart illustrating a sidelink-based transmission method according to the example, besides the step 201, the following step may be included.

At step 202, at least one of first target indication information or second target indication information transmitted by the transmitter through a fourth sidelink channel is received.

In this step, if the target information is transmitted to the receiver by the transmitter through the first sidelink channel, the transmitter may further transmit at least one of the first target indication information or the second target indication information to the receiver through the fourth sidelink channel.

The fourth sidelink channel is configured to transmit control information associated with the data; the first target indication information is configured to indicate whether the data and the feedback information are included in the third sidelink channel; and the second target indication information is configured to indicate a modulation and coding efficiency at which the feedback information is transmitted through the third sidelink channel. In one or more embodiments, the second target indication information may indicate a ratio of the modulation and coding efficiency of the data with respect to that of the feedback information.

The receiver may receive at least one of the first target indication information or the second target indication information in any one of the following ways, where the at least one of the first target indication information or the second target indication information is transmitted by the transmitter through the fourth sidelink channel.

In the first way, if a demodulation reference signal sequence received from the fourth sidelink channel indicates a preset demodulation reference signal sequence, it is determined that the first target indication information indicates that the data and the feedback information are included in the first sidelink channel, and/or it is determined that the second target indication information indicates a preset value.

In this way, if the demodulation reference signal sequence received by the receiver from the fourth sidelink channel indicates the preset demodulation reference signal sequence, the receiver may determine that the first target indication information indicates that the data and the feedback information are included in the first sidelink channel.

Or, the receiver defaults that the data and the feedback information are included in the first sidelink channel. Thus, the receiver may determine that the second target indication information indicates the preset value if the demodulation reference signal sequence indicates the preset demodulation reference signal sequence.

Or, the demodulation reference signal sequence received by the receiver from the fourth sidelink channel indicates the preset demodulation reference signal sequence. Thus, the receiver may determine that the first target indication information indicates that the data and the feedback information are included in the first sidelink channel, and also determine that the second target indication information indicates the preset value.

Of course, if the demodulation reference signal sequence received by the receiver from the fourth sidelink channel does not indicate the preset demodulation reference signal sequence, the receiver may determine that the first target indication information indicates that the feedback information is not included in the first sidelink channel.

In the second way, if position information corresponding to the demodulation reference signal sequence received from the fourth sidelink channel indicates a designated position, it is determined that the first target indication information indicates that the data and the feedback information are included in the first sidelink channel, and/or it is determined that the second target indication information indicates a preset value.

In this way, if the demodulation reference signal sequence received by the receiver from the fourth sidelink channel is located in the designated position, the receiver may determine that the first target indication information indicates that the data and the feedback information are included in the first sidelink channel.

Or, the receiver defaults that the data and the feedback information are included in the first sidelink channel. Thus, the receiver may determine that the second target indication information indicates the preset value if the demodulation reference signal sequence is located in the designated position.

Or, the demodulation reference signal sequence received by the receiver from the fourth sidelink channel is located in the designated position. Thus, the receiver may determine that the first target indication information indicates that the data and the feedback information are included in the first sidelink channel, and also determine that the second target indication information indicates the preset value.

Of course, if the demodulation reference signal sequence received by the receiver from the fourth sidelink channel is not located in the designated position, the receiver may determine that the first target indication information indicates that the feedback information is not included in the first sidelink channel.

In the third way, target control information transmitted by the transmitter through the fourth sidelink channel is received. The target control information carries at least one of the first target indication information or the second target indication information.

In this way, the target control information may be SCI information. In one or more embodiments, it may configure corresponding information field(s) for at least one of the first target indication information or the second target indication information in the SCI information.

When the bit value of the information field corresponding to the first target indication information is determined to be 1, the receiver may determine that the first target indication information indicates that the data and the feedback information are included in the first sidelink channel. When the bit value of the information field corresponding to the first target indication information is 0, it means the first target indication information indicates that the feedback information is not included in the first sidelink channel. The reverse may work similarly.

If the receiver determines that the bit value of the information field corresponding to the second target indication information is 01, it means the second target indication information indicates 01 or a first preset value a corresponding to 01, and if the bit value of the information field corresponding to the second target indication information is 10, it means the second target indication information indicates 10 or a second preset value b corresponding to 10.

In an example, if the feedback information includes a plurality of pieces of sub-information corresponding to different feedback information types, for example, both HARQ feedback information and CSI, the transmitter may transmit a modulation and coding rate, at which sub-information with a designated feedback information type is transmitted through the third sidelink channel, to the receiver. The second target indication information received by the receiver may include the modulation and coding efficiency at which the sub-information with the designated feedback information type is transmitted by the transmitter through the first sidelink channel.

For example, the designated feedback information types include an HARQ feedback type and an SCI type. Therefore, the receiver may receive the modulation and coding efficiency a1 corresponding to the HARQ feedback information and the modulation and coding efficiency a2 corresponding to the CSI, which are transmitted by the transmitter. The values of a1 and a2 may be the same or different. The modulation and coding efficiency of the sub-information corresponding to another feedback information type may be a preset modulation and coding efficiency b.

Thereafter, the receiver may demodulate the corresponding sub-information from the first sidelink channel based on respective modulation and coding rates corresponding to the sub-information of different feedback information types according to the related art.

Figure 6:
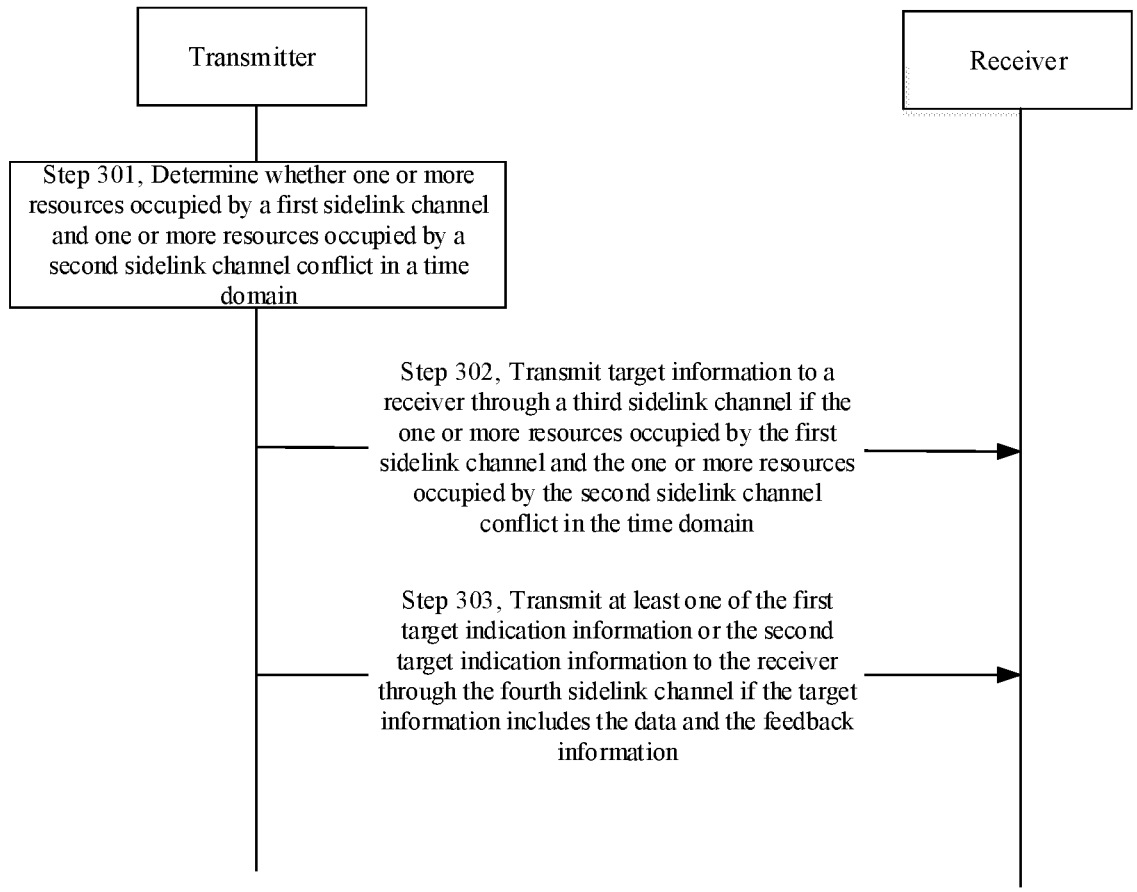
FIG. 6 is a flowchart illustrating another sidelink-based transmission method according to an example.

In one example, referring to FIG. 6, which is a flowchart illustrating another sidelink-based transmission method according to the example, the following steps may be included.

At step 301, the transmitter determines whether one or more resources occupied by a first sidelink channel and one or more resources occupied by a second sidelink channel conflict in a time domain.

The first sidelink channel is used for transmitting data for the sidelink, and the second sidelink channel is used for transmitting feedback information for the sidelink.

At step 302, target information is transmitted to a receiver through a third sidelink channel if the one or more resources occupied by the first sidelink channel and the one or more resources occupied by the second sidelink channel conflict in the time domain. The target information includes at least one of the data or the feedback information.

If a receiver address corresponding to the data is consistent with a receiver address corresponding to the feedback information, the target information includes the data and the feedback information, and the first sidelink channel is taken as the third sidelink channel.

If the receiver address corresponding to the data is inconsistent with the receiver address corresponding to the feedback information, the target information consists of the data or the feedback information. Further, if a transmission priority of the data is higher than that of the feedback information, the target information is the data, and the first sidelink channel is taken as the third sidelink channel; if the transmission priority of the feedback information is higher than or equal to that of the data, the target information is the feedback information, and the second sidelink channel is taken as the third sidelink channel.

At step 303, if the target information includes the data and the feedback information, the transmitter transmits at least one of the first target indication information or the second target indication information to the receiver through the fourth sidelink channel.

In the above example, the step 303 may be performed before or at the time of performing the step 302. The order of performing various steps is not limited in the examples of the present disclosure.

In the above example, in the case that one or more resources occupied by a data channel of a sidelink communication and one or more resources occupied by a feedback information channel of the sidelink communication conflict in a time domain, the data and the feedback information may be multiplexed in the first sidelink channel when a receiver address corresponding to the data is consistent with a receiver address corresponding to the feedback information. Therefore, during a process of the sidelink communication, it achieves a purpose that the data and the feedback information are multiplexed in the first sidelink channel used for transmitting the data for the sidelink. If the receiver address corresponding to the data is inconsistent with the receiver address corresponding to the feedback information, the information with higher transmission priority may be transmitted to the receiver through a corresponding sidelink channel, which achieves a purpose of transmitting the data or the feedback information to the receiver through the corresponding sidelink channel.

Corresponding to the above method examples implementing application functions, the present disclosure also provides examples of apparatuses for implementing application functions, and examples of corresponding base stations and terminals.

Figure 7:
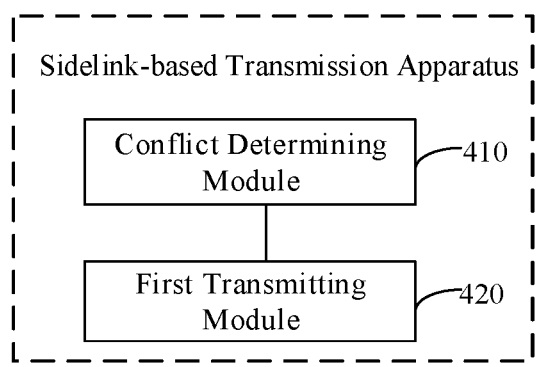
FIG. 7 is a block diagram illustrating a sidelink-based transmission apparatus according to an example.

Referring to FIG. 7, FIG. 7 is a block diagram illustrating a sidelink-based transmission apparatus according to an example. The apparatus is applicable to a transmitter and includes:

a conflict determining module 410 that is configured to determine whether one or more resources occupied by a first sidelink channel and one or more resources occupied by a second sidelink channel conflict in a time domain, where the first sidelink channel is used for transmitting data for the sidelink and the second sidelink channel is used for transmitting feedback information for the sidelink; and a first transmitting module 420 that is configured to transmit target information to a receiver through a third sidelink channel in response to determining that the one or more resources occupied by the first sidelink channel and the one or more resources occupied by the second sidelink channel conflict in the time domain, where the target information includes at least one of the data or the feedback information.

In one or more embodiments, the first sidelink channel is taken as the third sidelink channel in response to determining that the target information includes the data and the feedback information.

Figure 8:
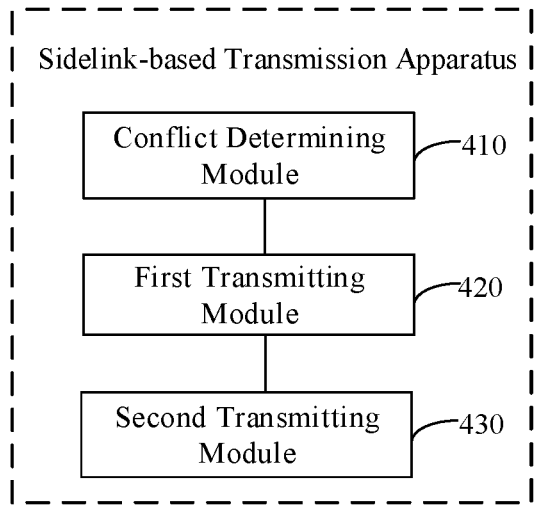
FIG. 8 is a block diagram illustrating another sidelink-based transmission apparatus according to an example.

Referring to FIG. 8, which is a block diagram illustrating another sidelink-based transmission apparatus on the basis of the example illustrated in FIG. 7, the apparatus further includes:

a second transmitting module 430 that is configured to transmit at least one of first target indication information or second target indication information to the receiver through a fourth sidelink channel.

The fourth sidelink channel is configured to transmit control information associated with the data; the first target indication information is configured to indicate whether the data and the feedback information are included in the third sidelink channel; and the second target indication information is configured to indicate a modulation and coding efficiency at which the feedback information is transmitted through the third sidelink channel.

Figure 9:
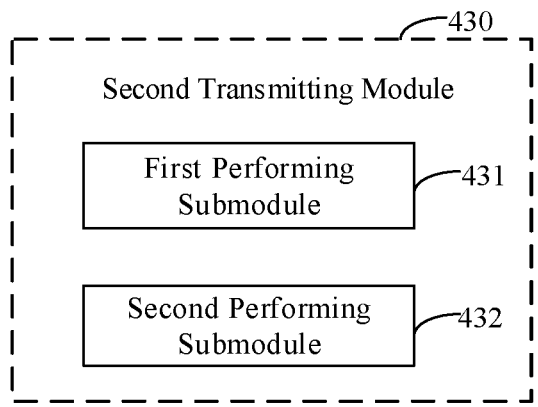
FIG. 9 is a block diagram illustrating another sidelink-based transmission apparatus according to an example.

Referring to FIG. 9, which is a block diagram illustrating another sidelink-based transmission apparatus on the basis of the example illustrated in FIG. 8, the second transmitting module 430 includes:

a first performing submodule 431 that is configured to represent, by a demodulation reference signal sequence in the fourth sidelink channel, at least one of the first target indication information or the second target indication information; or a second performing submodule 432 that is configured to represent, by position information corresponding to the demodulation reference signal sequence in the fourth sidelink channel, at least one of the first target indication information or the second target indication information.

Figure 10:
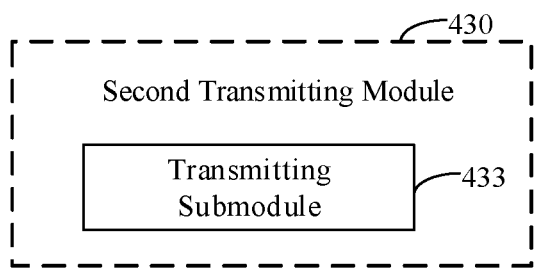
FIG. 10 is a block diagram illustrating another sidelink-based transmission apparatus according to an example.

Referring to FIG. 10, which is a block diagram illustrating another sidelink-based transmission apparatus on the basis of the example illustrated in FIG. 8, the second transmitting module 430 includes:

a transmitting submodule 433 that is configured to transmit target control information to the receiver through the fourth sidelink channel, where the target control information carries at least one of the first target indication information or the second target indication information.

Alternatively or additionally, in response to determining that the feedback information includes a plurality of pieces of sub-information corresponding to different feedback information types, the second target indication information includes a modulation and coding efficiency at which sub-information with a designated feedback information type is transmitted through the third sidelink channel.

In one or more embodiments, a receiver address corresponding to the data is consistent with a receiver address corresponding to the feedback information.

In one or more embodiments, the first sidelink channel is taken as the third sidelink channel in response to determining that the target information consists of the data; and the second sidelink channel is taken as the third sidelink channel in response to determining that the target information consists of the feedback information.

Figure 11:
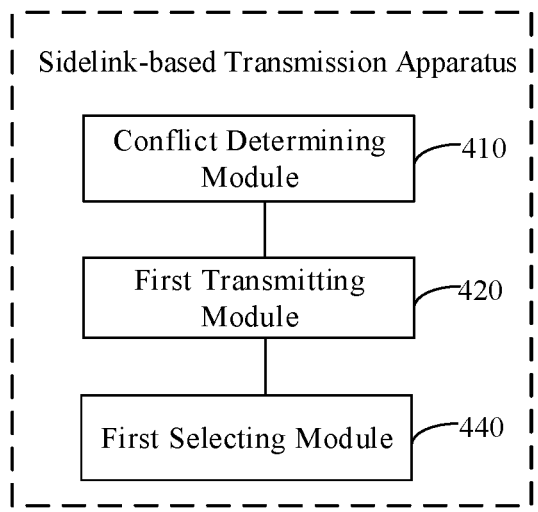
FIG. 11 is a block diagram illustrating another sidelink-based transmission apparatus according to an example.

Referring to FIG. 11, which is a block diagram illustrating another sidelink-based transmission apparatus on the basis of the example illustrated in FIG. 7, the apparatus further includes:

a first selecting module 440 that is configured to select one or more resources that do not overlap with the one or more resources occupied by the second sidelink channel in time resource as the one or more resources occupied by the first sidelink channel in response to determining that the one or more resources occupied by the first sidelink channel are selected by the transmitter.

Figure 12:
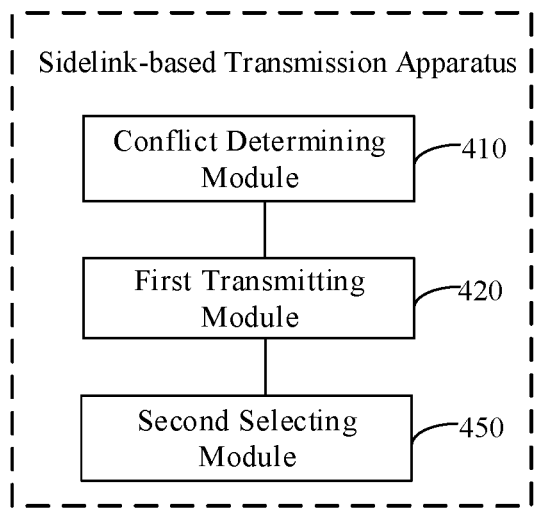
FIG. 12 is a block diagram illustrating another sidelink-based transmission apparatus according to an example.

Referring to FIG. 12, which is a block diagram illustrating another sidelink-based transmission apparatus on the basis of the example illustrated in FIG. 7, the apparatus further includes:

a second selecting module 450 that is configured to select one or more resources that do not overlap with the resource occupied by the first sidelink channel in time resource as the one or more resources occupied by the second sidelink channel in response to determining that the one or more resources occupied by the second sidelink channel are selected by the transmitter.

In one or more embodiments, a receiver address corresponding to the data is inconsistent with a receiver address corresponding to the feedback information.

Figure 13:
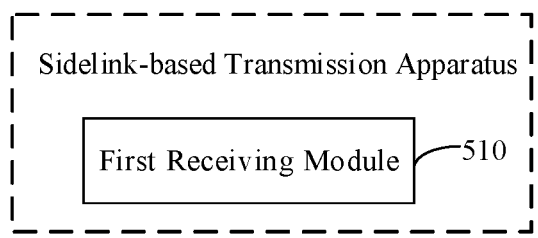
FIG. 13 is a block diagram illustrating another sidelink-based transmission apparatus according to an example.

Referring to FIG. 13, which is a block diagram illustrating a sidelink-based transmission apparatus according to an example, the apparatus is applicable to a receiver and includes:

a first receiving module 510 that is configured to receive target information transmitted by a transmitter through a first sidelink channel, where the first sidelink channel is used for transmitting data for the sidelink, and where the target information includes the data or includes the data and feedback information.

Figure 14:
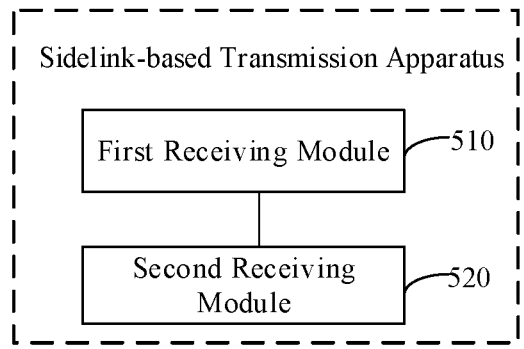
FIG. 14 is a block diagram illustrating another sidelink-based transmission apparatus according to an example.

Referring to FIG. 14, which is a block diagram illustrating another sidelink-based transmission apparatus on the basis of the example illustrated in FIG. 13, the apparatus further includes:

a second receiving module 520 that is configured to receive at least one of first target indication information or second target indication information transmitted by the transmitter through a fourth sidelink channel.

The fourth sidelink channel is configured to transmit control information associated with the data; the first target indication information is configured to indicate whether the data and the feedback information are included in the third sidelink channel; and the second target indication information is configured to indicate a modulation and coding efficiency at which the feedback information is transmitted through the third sidelink channel.

Figure 15:
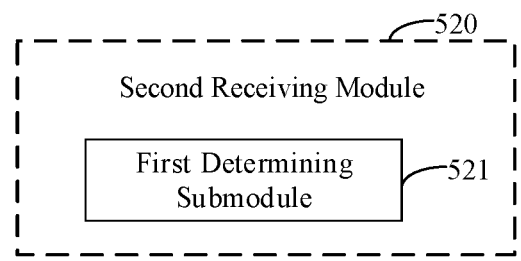
FIG. 15 is a block diagram illustrating another sidelink-based transmission apparatus according to an example.

Referring to FIG. 15, which is a block diagram illustrating another sidelink-based transmission apparatus on the basis of the example illustrated in FIG. 14, the second receiving module 520 includes:

a first determining submodule 521 that is configured to determine, in response to determining that a demodulation reference signal sequence received from the fourth sidelink channel indicates a preset demodulation reference signal sequence, that the first target indication information indicates that the data and the feedback information are included in the first sidelink channel, and/or that the second target indication information indicates a preset value.

Figure 16:
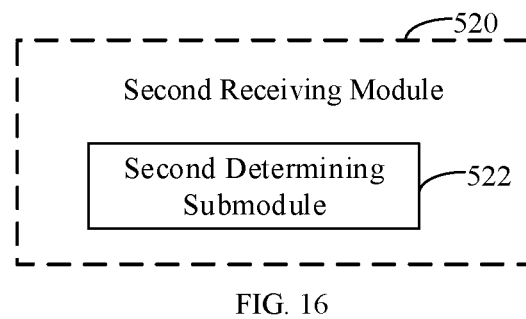
FIG. 16 is a block diagram illustrating another sidelink-based transmission apparatus according to an example.

Referring to FIG. 16, which is a block diagram illustrating another sidelink-based transmission apparatus on the basis of the example illustrated in FIG. 14, the second receiving module 520 includes:

a second determining submodule 522 that is configured to determine, in response to determining that position information corresponding to a demodulation reference signal sequence received from the fourth sidelink channel indicates a designated position, that the first target indication information indicates that the data and the feedback information are included in the first sidelink channel, and/or that the second target indication information indicates a preset value.

Figure 17:
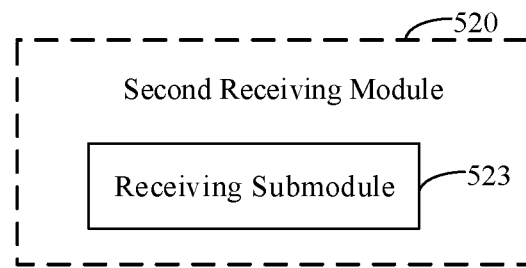
FIG. 17 is a block diagram illustrating another sidelink-based transmission apparatus according to an example.

Referring to FIG. 17, which is a block diagram illustrating another sidelink-based transmission apparatus on the basis of the example illustrated in FIG. 14, the second receiving module 520 includes:

a receiving submodule 523 that is configured to receive target control information transmitted by the transmitter through the fourth sidelink channel, where the target control information carries at least one of the first target indication information or the second target indication information.

In one or more embodiments, in response to determining that the feedback information includes a plurality of pieces of sub-information corresponding to different feedback information types, the second target indication information includes a modulation and coding efficiency at which sub-information with a designated feedback information type is transmitted by the transmitter through the first sidelink channel.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement without creative work.

Correspondingly, the present disclosure also provides a computer-readable storage medium storing a computer program. The computer program is configured to execute any one of the sidelink-based transmission methods applicable to a transmitter side described above.

Correspondingly, the present disclosure also provides a computer-readable storage medium storing a computer program. The computer program is configured to execute any one of the sidelink-based transmission methods applicable to a receiver side described above.

Correspondingly, the present disclosure also provides a sidelink-based transmission apparatus, which is applicable to a transmitter and includes:

a processor; and a memory, configured to store instructions executable by the processor;

where the processor is configured to:

determine whether one or more resources occupied by a first sidelink channel and one or more resources occupied by a second sidelink channel conflict in a time domain, where the first sidelink channel is used for transmitting data for the sidelink and the second sidelink channel is used for transmitting feedback information for the sidelink; and transmit target information to a receiver through a third sidelink channel in response to determining that the one or more resources occupied by the first sidelink channel and the one or more resources occupied by the second sidelink channel conflict in the time domain, where the target information includes at least one of the data or the feedback information.

Figure 18:
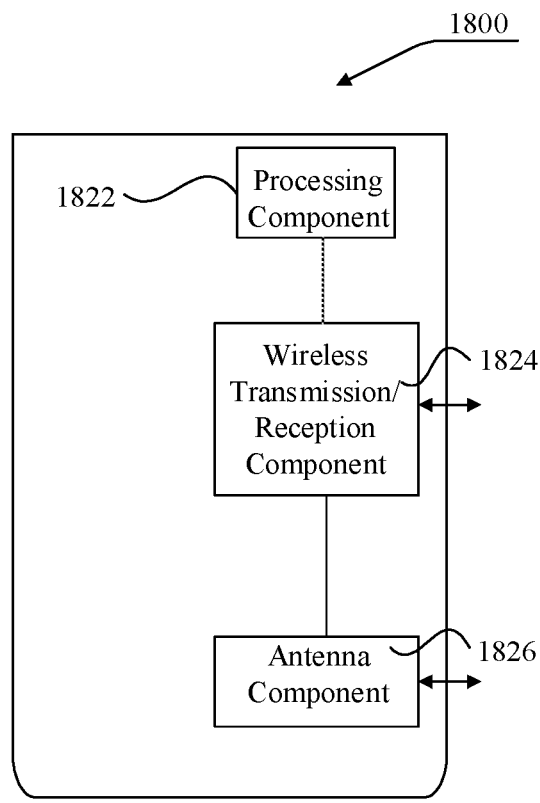
FIG. 18 is a schematic structural diagram for a sidelink-based transmission apparatus illustrated according to an example.

As illustrated in FIG. 18, FIG. 18 is a schematic structural diagram illustrating a sidelink-based transmission apparatus 1800 according to an example. The apparatus 1800 may be provided as a transmitter device. Referring to FIG. 18, the apparatus 1800 includes a processing component 1822, a wireless transmission/reception component 1824, an antenna component 1826, and a signal processing part peculiar to a wireless interface. The processing component 1822 may further include one or more processors.

One of the processors in the processing component 1822 may be configured to perform any one of the sidelink-based transmission methods applicable to the transmitter described above.

Correspondingly, the present disclosure also provides a sidelink-based transmission apparatus, which is applicable to a receiver and includes:

a processor; and a memory, configured to store instructions executable by the processor;

where the processor is configured to:

receive target information transmitted by a transmitter through a first sidelink channel, where the first sidelink channel is used for transmitting data for the sidelink, and where the target information includes the data or includes the data and feedback information.

Figure 19:
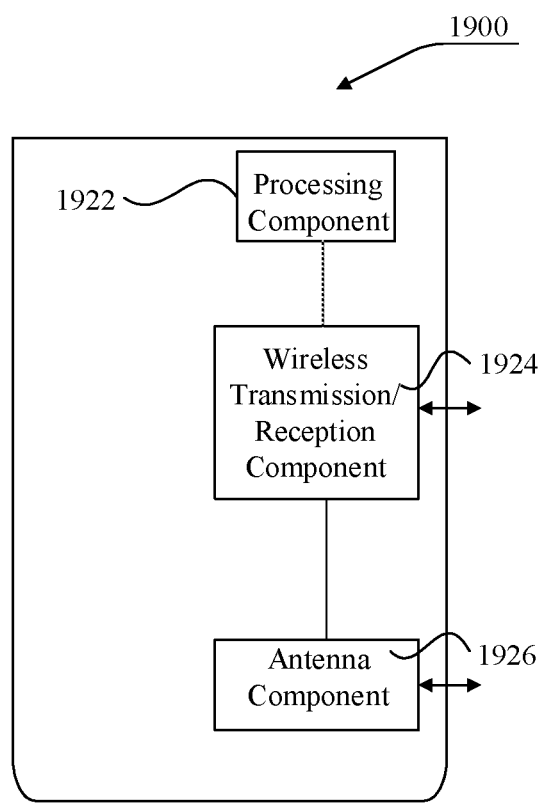
FIG. 19 is a schematic structural diagram for another sidelink-based transmission apparatus illustrated according to an example of the present disclosure.

As illustrated in FIG. 19, FIG. 19 is a schematic structural diagram illustrating a sidelink-based transmission apparatus 1900 according to an example. The apparatus 1900 may be provided as a receiver device. Referring to FIG. 19, the apparatus 1900 includes a processing component 1922, a wireless transmission/reception component 1924, an antenna component 1926, and a signal processing part peculiar to a wireless interface. The processing component 1922 may further include one or more processors.

One of the processors in the processing component 1922 may be configured to perform any one of the sidelink-based transmission methods applicable to the receiver described above.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure.

The description and the examples are only illustrative, and the true scope and spirit of the present disclosure are set forth in the appended claims.

The technical solutions provided by the embodiments of the present disclosure may produce the following beneficial effects.

In some embodiments of the present disclosure, in the case that one or more resources occupied by a data channel of a sidelink communication and one or more resources occupied by a feedback information channel of the sidelink communication conflict in a time domain, it can achieve a purpose that at least one of data or feedback information is transmitted to a receiver through a third sidelink channel. In some embodiments of the present disclosure, a first sidelink channel may be taken as the third sidelink channel in the case that target information includes both the data and the feedback information. Therefore, during a process of the sidelink communication, it achieves a purpose that the data and the feedback information are multiplexed in the first sidelink channel used for transmitting the data for the sidelink.

In some embodiments of the present disclosure, alternatively or additionally, in the case that the target information includes both the data and the feedback information, at least one of first target indication information or second target indication information may be transmitted to the receiver through a fourth sidelink channel. The fourth sidelink channel is configured to transmit control information associated with the data; the first target indication information is configured to indicate whether the data and the feedback information are included in the third sidelink channel; and the second target indication information is configured to indicate a modulation and coding efficiency at which the feedback information is transmitted through the third sidelink channel. Through such a process, the receiver can determine whether the data and the feedback information are included in the third sidelink channel, and/or determine the modulation and coding efficiency at which the feedback information is transmitted by the transmitter through the third sidelink channel. Thereafter, the feedback information can be correctly demodulated from the third sidelink channel.

In some embodiments of the present disclosure, the transmitter may represent at least one of the first target indication information or the second target indication information by a demodulation reference signal sequence or position information corresponding to the demodulation reference signal sequence in the fourth sidelink channel, which reduces the number of bits occupied by the control information and has a high availability.

In some embodiments of the present disclosure, alternatively or additionally, the transmitter may also transmit target control information to the receiver through the fourth sidelink channel, and the target control information carries at least one of the first target indication information or the second target indication information, which reduces a complexity of blind channel detection at the receiver and has a high availability.

In some embodiments of the present disclosure, in the case that the feedback information to be transmitted by the transmitter includes a plurality of pieces of sub-information corresponding to different feedback information types, the transmitter may transmit to the receiver a modulation and coding efficiency at which sub-information with a designated feedback information type is transmitted through the third sidelink channel. Thereafter, the receiver can correctly demodulate the plurality of pieces of sub-information of different feedback information types.

In some embodiments of the present disclosure, in the case that the target information transmitted by the transmitter to the receiver includes both the data and the feedback information, a receiver address corresponding to the data is consistent with a receiver address corresponding to the feedback information. Therefore, in the sidelink communication, it can avoid a conflict caused by different receiver addresses.

In some embodiments of the present disclosure, in the case that the target information consists of the data, the first sidelink channel for transmitting the data for the sidelink may be taken as the third sidelink channel; and in the case that the target information consists of the feedback information, the second sidelink channel for transmitting the feedback information for the sidelink may be taken as the third sidelink channel. Therefore, in the sidelink communication, when the one or more resources occupied by the first sidelink channel and the one or more resources occupied by the second sidelink channel conflict in the time domain, it can achieve a purpose that the data or the feedback information is transmitted to the receiver through the corresponding sidelink channel.

In some embodiments of the present disclosure, in the case that the one or more resources occupied by the first sidelink channel are selected by the transmitter, the transmitter may select one or more resources that do not overlap with the one or more resources occupied by the second sidelink channel in time resource as the one or more resources occupied by the first sidelink channel. Similarly, in the case that the one or more resources occupied by the second sidelink channel are selected by the transmitter, the transmitter may select one or more resources that do not overlap with the one or more resources occupied by the first sidelink channel in time resource as the one or more resources occupied by the second sidelink channel. Therefore, it can avoid the conflict in the time domain between the one or more resources occupied by the first sidelink channel and the one or more resources occupied by the second sidelink channel.

In some embodiments of the present disclosure, a receiver may receive target information transmitted by a transmitter through the first sidelink channel, where the first sidelink channel is used for transmitting data for the sidelink, and where the target information includes the data or includes the data and feedback information. Therefore, during a process of a sidelink communication, it achieves a purpose that the data and the feedback information are multiplexed in the first sidelink channel used for transmitting the data for the sidelink.

It is to be understood that the present disclosure is not limited to the precise structure described above and illustrated in the accompanying drawings, and that various modifications and changes can be made without departing from the scope thereof. The scope of the present disclosure is only limited by the appended claims.

The invention claimed is:

1. A sidelink-based transmission method, comprising:
   determining, by a transmitter, whether one or more resources occupied by a first sidelink channel and one or more resources occupied by a second sidelink channel conflict in a time domain, wherein the first sidelink channel is used for transmitting data for the sidelink and the second sidelink channel is used for transmitting feedback information for the sidelink; and
   transmitting, by the transmitter, target information to a receiver through a third sidelink channel in response to determining that the one or more resources occupied by the first sidelink channel and the one or more resources occupied by the second sidelink channel conflict in the time domain, wherein the target information comprises at least one of the data or the feedback information.

2. The method according to claim 1, wherein the first sidelink channel is taken as the third sidelink channel in response to determining that the target information comprises the data and the feedback information.

3. The method according to claim 2, further comprising:
   transmitting at least one of first target indication information or second target indication information to the receiver through a fourth sidelink channel;
   wherein the fourth sidelink channel is configured to transmit control information associated with the data;
   wherein the first target indication information is configured to indicate whether the data and the feedback information are comprised in the third sidelink channel; and
   wherein the second target indication information is configured to indicate a modulation and coding efficiency at which the feedback information is transmitted through the third sidelink channel.

4. The method according to claim 3, wherein transmitting at least one of the first target indication information or the second target indication information to the receiver through the fourth sidelink channel comprises at least one of following acts:
   representing, by a demodulation reference signal sequence in the fourth sidelink channel, at least one of the first target indication information or the second target indication information; or
   representing, by position information corresponding to the demodulation reference signal sequence in the fourth sidelink channel, at least one of the first target indication information or the second target indication information.

5. The method according to claim 3, wherein transmitting at least one of the first target indication information or the second target indication information to the receiver through the fourth sidelink channel comprises:
   transmitting target control information to the receiver through the fourth sidelink channel, wherein the target control information carries at least one of the first target indication information or the second target indication information.

6. The method according to claim 3, wherein in response to determining that the feedback information comprises a plurality of pieces of sub-information corresponding to different feedback information types, the second target indication information comprises a modulation and coding efficiency at which sub-information with a designated feedback information type is transmitted through the third sidelink channel.

7. The method according to claim 2, wherein a receiver address corresponding to the data is consistent with a receiver address corresponding to the feedback information.

8. The method according to claim 1, wherein
   the first sidelink channel is taken as the third sidelink channel in response to determining that the target information consists of the data; and
   the second sidelink channel is taken as the third sidelink channel in response to determining that the target information consists of the feedback information.

9. The method according to claim 1, further comprising:

in response to determining that the one or more resources occupied by the first sidelink channel are selected by the transmitter, selecting one or more resources that do not overlap with the one or more resources occupied by the second sidelink channel in time resource as the one or more resources occupied by the first sidelink channel.

10. The method according to claim 1, further comprising:
in response to determining that the one or more resources occupied by the second sidelink channel are selected by the transmitter, selecting one or more resources that do not overlap with the one or more resources occupied by the first sidelink channel in time resource as the one or more resources occupied by the second sidelink channel.

11. The method according to claim 8, wherein a receiver address corresponding to the data is inconsistent with a receiver address corresponding to the feedback information.

12. A sidelink-based transmission apparatus, being applicable to a transmitter and comprising:
a processor; and
a memory, configured to store instructions executable by the processor;
wherein the processor is configured to:
determine whether one or more resources occupied by a first sidelink channel and one or more resources occupied by a second sidelink channel conflict in a time domain, wherein the first sidelink channel is used for transmitting data for the sidelink and the second sidelink channel is used for transmitting feedback information for the sidelink; and
transmit target information to a receiver through a third sidelink channel in response to determining that the one or more resources occupied by the first sidelink channel and the one or more resources occupied by the second sidelink channel conflict in the time domain, wherein the target information comprises at least one of the data or the feedback information.

13. The apparatus according to claim 12, wherein the first sidelink channel is taken as the third sidelink channel in response to determining that the target information comprises the data and the feedback information.

* * * * *